United States Patent [19]

Lloyd et al.

[11] 3,916,439

[45] Oct. 28, 1975

[54] INSPECTION SYSTEM EMPLOYING DIFFERENTIAL IMAGING

[75] Inventors: Raymond A. Lloyd, Laurel; William L. Hrybyk, Linthicum; Kenneth C. Ryan, Finksburg, all of Md.

[73] Assignee: Westinghouse Electric Corporation, Pittsburgh, Pa.

[22] Filed: Mar. 8, 1974

[21] Appl. No.: 449,561

[52] U.S. Cl. .............................. 358/81; 178/DIG. 37

[51] Int. Cl.[2] .............................................. H04N 7/18

[58] Field of Search ....... 178/6, 8, DIG. 1, DIG. 37, 178/DIG. 38; 358/81, 82

[56] References Cited

UNITED STATES PATENTS 3,049,588 8/1962 Barnett ........................ 178/DIG. 37

3,811,010 5/1974 Long .................................. 178/6.8

*Primary Examiner*—Howard W. Britton

*Attorney, Agent, or Firm*—J. B. Hinson

[57] ABSTRACT

A system for inspecting a device to determine if it meets predetermined specification is disclosed. The system utilizes a TV image of a member of a class of devices to be inspected as a model to which a TV image of the device being inspected is compared to detect the differences therebetween. The differences between these two TV images is displayed on a color TV monitor in a first color. The TV image of the model being inspected is also displayed on the same monitor in a second color. This generates a composite television display in which the differences between the TV image of the specimen being inspected and the model thereof are displayed in one color while the remainder of the images is displayed in a second color. The differences in color permits the deviations from normal to be easily detected visually.

10 Claims, 5 Drawing Figures

INSPECTION SYSTEM EMPLOYING DIFFERENTIAL IMAGING

BACKGROUND OF THE INVENTION

Field of the Invention

The invention relates to inspection systems and methods and more specifically to inspection systems and methods for detecting defects by comparing TV images of the device being inspected to the TV image of a similar device which is known to be free of defects.

SUMMARY OF THE INVENTION

An inspection system employing differential images is disclosed. Defects in the device being inspected are determined by comparing a TV image of a model of the device to a TV image of the device being inspected detect differences therebetween. The TV image of the model is normally obtained by focusing a TV camera on a specimen known to be good and storing the resulting TV image in a storage system such as a video magnetic drum. A device is inspected by focusing the TV camera on the device to generate a TV image thereof. This TV image of the device being inspected is compared with the image of the device previously stored to generate a video signal equal to the difference therebetween. This signal is then converted to an absolute value signal to generate a video signal indicative of the differences between the video image of the model and the video image of the device being inspected. This signal is coupled to a first color input, red for example of a color TV monitor. The TV image of the device being inspected is coupled to a second color input, green for example of the same TV monitor. This generates a composite TV display in which the differences between the TV images of the device being inspected and the TV image of the model are displayed in different colors. This permits the operator of the system to easily detect differences between the model and the device being inspected to determine if the device being inspected meets specifications. This system is particularly advantageous in detecting missing components and other physical defects in devices such as electronic modules or substrates used in such modules.

The images of the devices may also be produced by other techniques. The basic requirement is that two signals indicative of the characteristics of the devices be produced so that the signals indicative of the characteristics of the device known to be good can be easily compared to similar signals related to the device being inspected.

DETAILED DESCRIPTION OF THE PREFERRED EMBODIMENT

Figure 1:
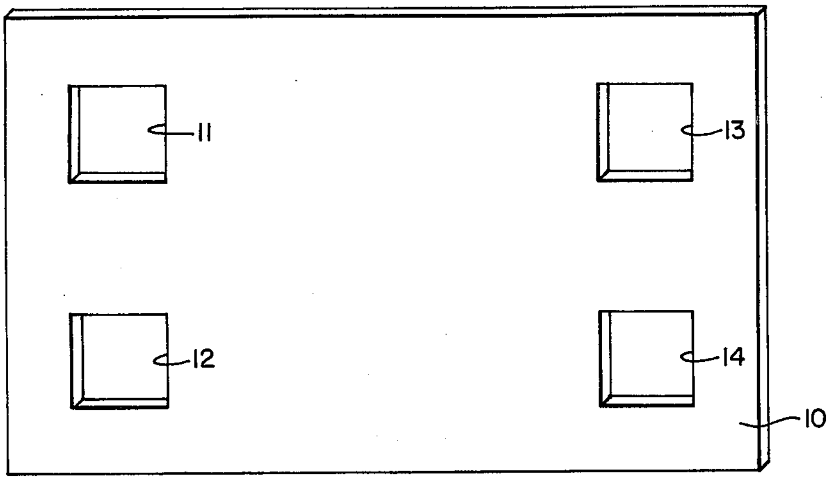
FIG. 1 is a drawing of the model substrate used to illustrate the operation of the invention.

The operation of the inspection system will be discussed in detail by illustrating how a typical structure is inspected utilizing the system. The typical structure illustrated in FIG. 1 is a section of a ceramic substrate having holes therein. Substrates of this type and widely used in the electronic industry. The disclosed system will be discussed with reference to the problem of examining the illustrated substrate to determine if the substrate contains the proper number of openings having the proper size and shape.

The substrate illustrated in FIG. 1 is by definition a model of the substrates to be inspected. The model is inspected by other means to determine that the model complies with appropriate specifications. The basic substrate 10 is substantially rectangular and contains four rectangular openings illustrated at reference numeral 11 thru 14. The inspection system compares television images of the specimen being inspected to the television images of the model. Significant differences between these images indicates that the specimen being inspected is faulty.

Other images comprising electrical signals indicative of the characteristics of the model and subject devices may also be used. TV images are only an example.

Figure 2:
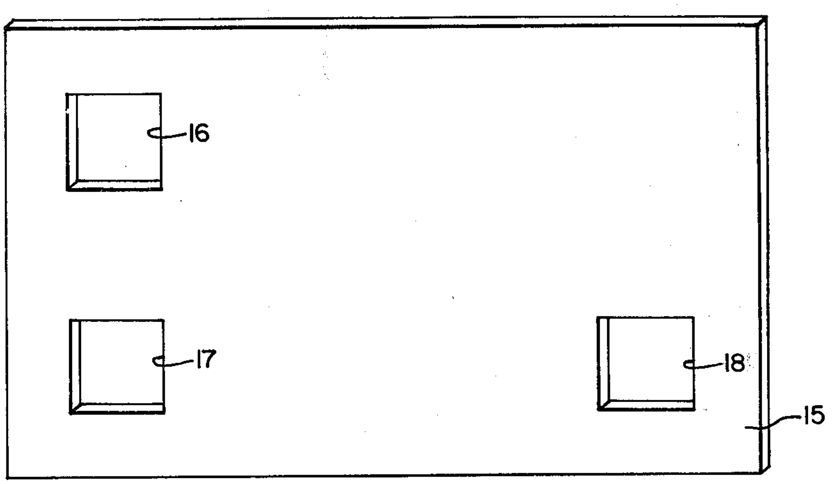
FIG. 2 is a drawing of a subject substrate used to illustrate the operation of the system.

The subject substrate to be inspected to demonstrate the operation of the system is illustrated in FIG. 2. The subject substrate 15 is normally identical to the model substrate illustrated in FIG. 1. However to illustrate how the subject substrate is compared to the model substrates to detect errors only three openings 16, 17 and 18 have been included in the subject substrate illustrated in FIG. 2.

Figure 3:
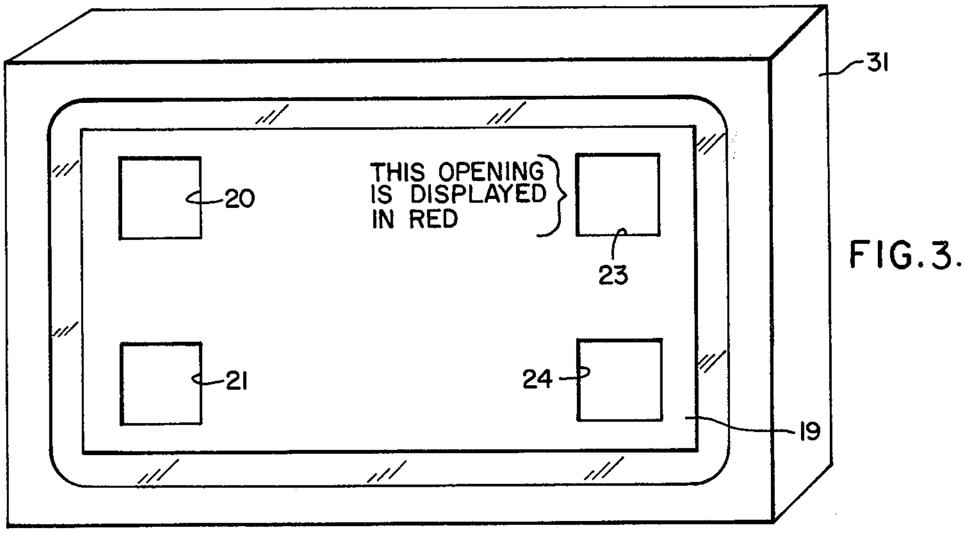
FIG. 3 is a composite TV display generated by comparing the TV image of the subject substrate illustrated in FIG. 2 to the stored TV image of the model illustrated in FIG. 1.

The result of comparing the subject and model substrates is a TV type display as illustrated in FIG. 3. The TV display illustrated in FIG. 3 is a composite of the TV image of the model substrate illustrated in FIG. 1 and the subject substrate illustrated in FIG. 2 with the areas where the model and the subject are identical being displayed in green on a color TV monitor with the differences between the model and the subject displayed in red. This permits the differences between the model and the subject to be easily identified. From this display the operator of the system should be able to easily determine whether or not the subject is acceptable.

More specifically, the difference between the model and the subject substrate is that in the subject the hole 13 in FIG. 1 in the upper right hand corner is missing. This difference is illustrated in the composite TV image at reference numeral 23 and is displayed in red. The remaining portions of the composite TV image are green indicating that these portions of the model and subject substrates are identical.

Figure 4:
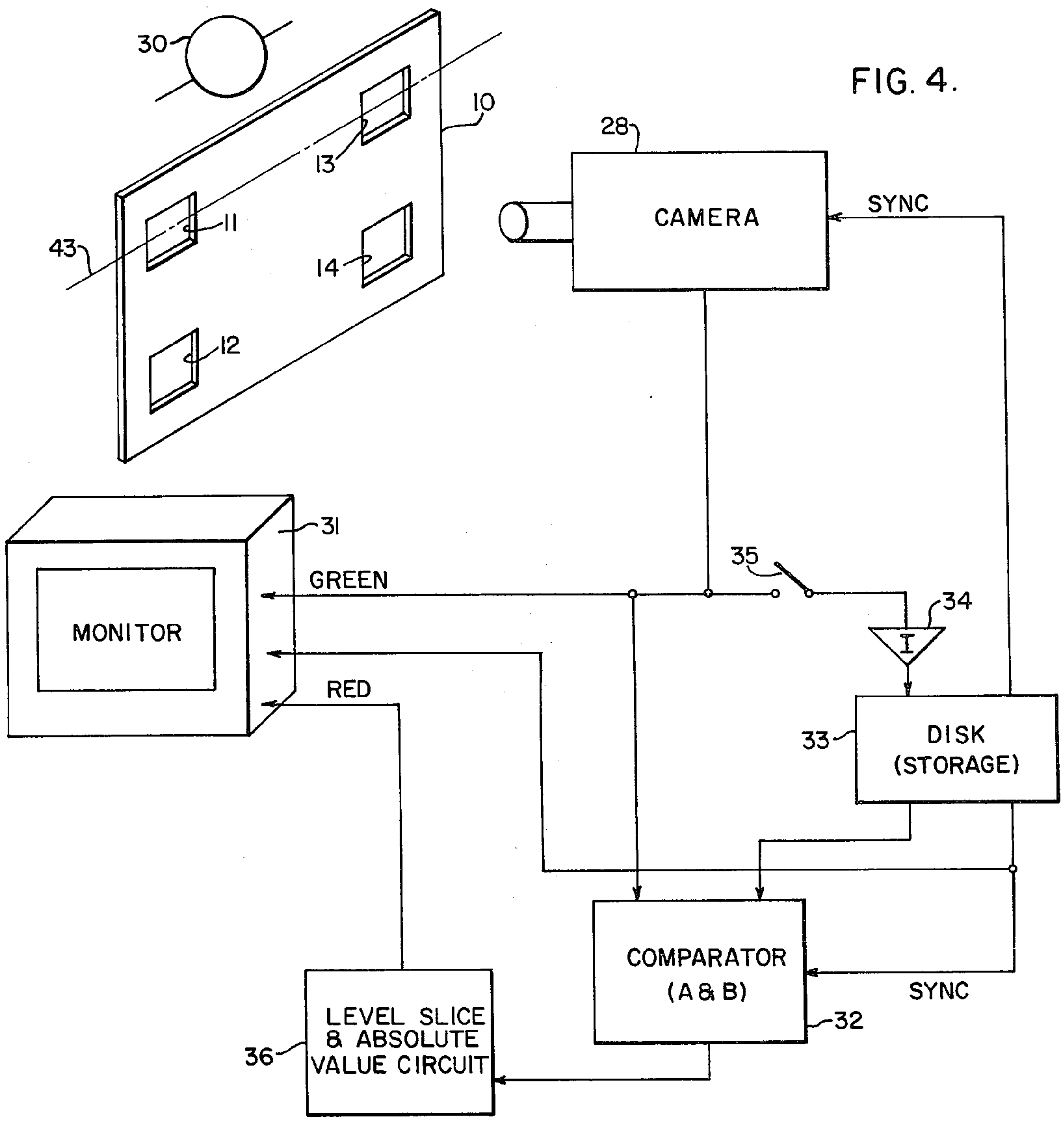
FIG. 4 is a block diagram of the inspection system.

The basic inspection system is illustrated in FIG. 4. The system includes a TV camera 28 which is focused on the model substrate 10. The substrate may either be the model or the subject substrate depending on whether the system is in the set-up or inspect mode of operation. This will be described in more detail later.

In the example illustrating the operation of the inspection system the subject substrate 15 (FIG. 2) will be examined to determine if the substrate 15 contains the proper number of holes. Therefore, the most convenient way of lighting the substrate is by using a light source 30 which is positioned behind the substrate so that light will pass through the opening and impinge on the lens of the TV camera 28. This lighting technique gives the highest contrast between the holes and the substrate. The video output signal of the TV camera 28 is coupled to the green input terminal of a color TV monitor 31, to one input of an analog video signal comparator 32, and to a video storage unit 33 through an inverter 34 and a switch 35. The detail operation of the switch will be described later. The storage unit 33 also produces synchronization signals which are coupled to the TV camera 28, the monitor 31 and the video comparator 32.

The output of the comparator 32 also passes through a level slicer and absolute value circuit 36. The output signal of the level slicer and absolute value circuit 36 is the absolute value of the difference between the TV images of the model and the subject. This signal is coupled to the red video input of the TV monitor 31.

The operation of the system illustrated in FIG. 4 will now be described in detail by illustrating how the model substrate 10 illustrated in FIG. 1, is compared with the subject substrate 15 illustrated in FIG. 2, to generate a composite TV display in which the differences between the TV images of the subject and model substrates are displayed in a color differing from the remainder of the composite image.

As illustrated in FIG. 4 the TV camera 28 is focused on the model substrate 10. As is well known a conventional TV camera as illustrated in FIG. 4 scans the subject matter one line at a time. Therefore, the model and subject substrates will be scanned along a similar line to generate a single line of video information illustrating how corresponding portions of the TV images of the model and subject substrates are generated. The model and subject substrates will be scanned along a scan line 43 illustrated in FIG. 4. The details of the various video signals taken along this scan line are illustrated in more detail in FIG. 5.

As a part of the set-up mode the model substrate is positioned as illustrated in FIG. 4. The switch 35 is closed to couple the video output of the TV camera 28 to the input of the inverter 34. The system is then energized and the TV camera 28 completely scans the model substrate to generate a TV image of this substrate. The video information is inverted by an inverter 34 and stored in the storage unit 33. The single line of video resulted from scanning the model substrate 10 along the line 43 illustrated in FIG. 4 is shown as reference numeral 44 in FIG. 5. This signal includes two peaks, 45 and 46, which result from the light shining through the opening 11 and 13 in the model substrate 10. This video signal is inverted and stored in the disc storage unit 43. The signal as stored on the disc is illustrated at reference numeral 47 of FIG. 5. Each and every line resulting from scanning the model is similarly stored in the memory. Once a complete TV image of the model substrate has been stored, the switch 35 is opened and no additional information is stored in the storage unit 33. Switch 35 would normally be automated because a manual switch is to slow.

The subject substrate 15 to be inspected, illustrated in FIG. 2, is now positioned such that the TV camera 28 is focused on this substrate. A TV image of the subject substrate 15 is compared with the storage image of the model substrate 10. This is accomplished by scanning the subject with the TV camera 28 to generate a TV image which is compared to the stored TV image of the model substrate 10. The live TV image of the subject substrate 15 is also coupled to a first input of a video comparator 32. The second input to the comparator 32 is the TV image of the model substrate stored in the storage unit 33. The video comparator 32 generates an output signal which is equal to the algebraic sum of the inverted storage TV image of the model substrate 10 and the live TV image of the subject substrate 15. Since an algebraic sum of these two signals may result in either a plus and minus signal and that the video input of the TV monitor 33 only responds to positive signals it is desirable to convert the video output of the comparator 32 to an absolute value signal before it is coupled to the monitor. Also the signals may not be excatly equal therefore, it may be desirable to require that the result of the comparison exceed a preset value before any video information is coupled to the red input of the TV monitor 31. This function is accomplished by coupling this signal to the red input of the TV monitor 31 through a level slicer and absolute value comparison circuit 36. This circuit converts the output signal of the comparator 32 to an absolute value signal and inhibits coupling of the absolute value signal to the red input of the TV monitor 31 until it exceeds a preset value. This prevents a slight inbalance in the input signals from generating a false difference signal.

The output signal of the level slicer and absolute value circuit 36 is coupled to the red input of the TV monitor 31 causing the difference between TV images of the subject and the model substrates to be displayed in red.

Figure 5:
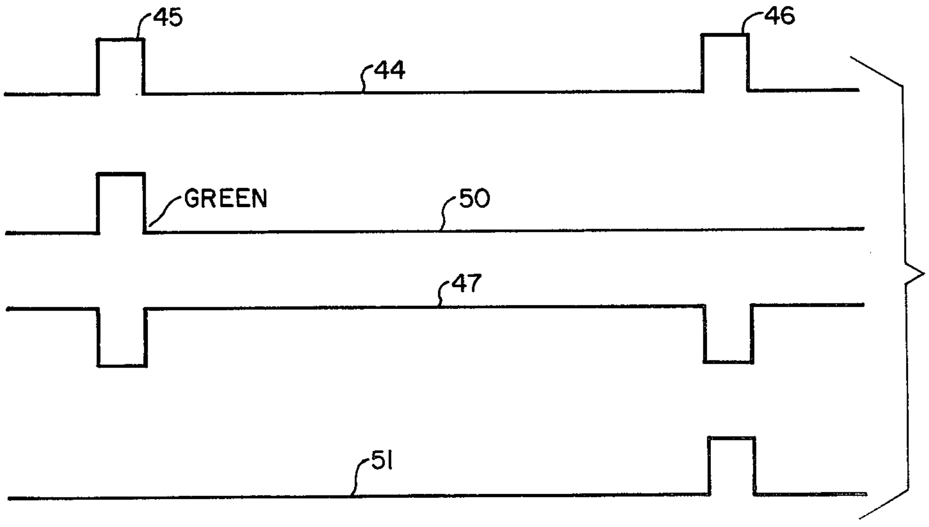
FIG. 5 is a drawing illustrating typical video signals generated by a system.

A composite TV signal resulting from the processing of comparable lines of the TV images of the model and subject substrates is illustrated at reference numeral 51 of FIG. 5. This signal contains one positive peak resulting from the opening 13 of the model substrate 10. The two signals used to generate the composite signal are illustrated at reference numerals 47 and 50. As can be seen from a casual examination of these two signals, the simple algebraic sum would result in a negative going pulse. However, as previously described, this signal is converted by the level slice and absolute valve circuit 36 to a positive signal as illustrated at reference numeral 51 of FIG. 5. This composite signal is coupled to the red input terminal of the TV monitor while the output signal of the TV camera 50 is coupled to the green input signal of the monitor. This results in composite TV image illustrated in FIG. 3 in which the like portions of the images are displayed in green and the differences are displayed in red. The openings where the subject and model substrates correspond are illustrated in FIG. 3 at reference numerals 20, 21 and 24 while the opening where they are different is illustrated at reference numeral 23.

The system illustrated in FIG. 4 can be assembled using conventional component. Typical model numbers and manufacturers for the components are listed below.

1. The camera may be a model 113 manufactured by KGM.
2. The disc storage 33 may be a Model 410 manufactured by Colorado Video Inc.
3. The comparator may be a Model A-12/C manufactured by Antech.
4. The level slicer and absolute value circuit may be a Model A-12/C manufactured by Antech.
5. The TV monitor may be a model 650-I manufactured by Tektronix.

Many modifications of the system illustrated in FIG. 5 may be made to adapt it to specific applications. For example, in some applications front or side illumination of the subject might be more advantageous. System components other than those given above as examples may also be used.

What we claim is:

1. A system for inspecting a member of a class of devices to determine if the member being inspected meets predetermined specifications, comprising in combination:

a. a TV camera for forming an image of a model member of said class, said model member being known to be free of visually identifiable defects and an image of the member to be inspected;

b. means for storing and reproducing said image of said model member;

c. means for comparing the reproduced image of said model member to a TV image of said member to be inspected to produce a difference signal having a predetermined relationship to the difference between these two images; and d. display means generating a composite image comprising a combination of the image of said member to be inspected and said difference signal.

2. A system in accordance with claim 1 wherein said storage means is a magnetic disc.

3. A system in accordance with claim 1 further including display means whereby said difference signal is displayed in a first color and the image of said member to be inspected is displayed in a second color.

4. A system in accordance with claim 3 wherein said display means includes a color TV monitor with said difference signal being displayed in one color and the image of said member to be inspected being displayed in a second color.

5. A system in accordance with claim 4 further including means for limiting the display of said difference signals to the portion of that signal which exceeds a predetermined level.

6. A method for inspecting a member of a class of devices comprising the steps of:

a. producing a TV image of a model member of said class, said member having been previously inspected by other means to determine that said model member meets predetermined specification:

b. producing a TV image of a subject member of said class of devices whose characteristics are to be determined;

c. comparing the TV image of said model member to the TV image of said subject member to generate a difference signal indicating which portions of said member of said class of devices fail to meet predetermined specification; and coupling the TV image of said member of said class of devices to a first color input of a color TV monitor and said difference signal to a second color input of said color TV monitor to produce a composite image with the portion of said member of said class of devices which fail to meet said predetermined specification being easily identified by the color of the corresponding portion of said composite image.

7. The method defined by claim 6 further including the step of storing the TV image of said model member prior to comparing the TV images of said model and subject members.

8. The method defined by claim 7 further including the step of limiting the display of said difference signal to those portions of the signal which exceed a predetermined value.

9. The method defined by claim 7 further including the step of inverting the TV image of said model member prior to storing of said image.

10. The method defined by claim 9 wherein the TV images of said model and subject members are compared by adding on a line by line basis the stored TV image of said model member to the TV image of said subject member.

* * * * *